US012776870B2

(12) United States Patent
Shetty et al.

(10) Patent No.: US 12,776,870 B2
(45) Date of Patent: Oct. 27, 2026

(54) FREQUENCY HOPPING TECHNIQUE FOR MULTIPLE FREQUENCY BANDS IN NETWORKS

(71) Applicant: Honeywell International Inc., Charlotte, NC (US)

(72) Inventors: Udaya Shetty, Herndon, VA (US); Prasad Samudrala, Suwanee, GA (US); Mithun Mathew, Kasavanahalli (IN); Amit Kulkarni, Duluth, GA (US); Yuvaraj Nagendran, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 545 days.

(21) Appl. No.: 18/318,291

(22) Filed: May 16, 2023

(65) Prior Publication Data

US 2024/0388389 A1 Nov. 21, 2024

(51) Int. Cl.
*H04L 5/00* (2006.01)

(52) U.S. Cl.
CPC .................................. *H04L 5/0012* (2013.01)

(58) Field of Classification Search
CPC .......... H04L 5/0012; H04B 2001/7154; H04B 1/7143; H04B 1/715; H04W 84/18
See application file for complete search history.

(56) References Cited

U.S. PATENT DOCUMENTS

2005/0044319 A1* 2/2005 Olukotun ............ G06F 9/30032 711/119
2005/0281188 A1 12/2005 Cho et al.
2008/0285582 A1* 11/2008 Pister .................... H04W 40/24 370/431
2017/0213446 A1* 7/2017 Otis ....................... G08B 25/10
2018/0220417 A1* 8/2018 Matsuo ................. H04W 72/20
2019/0173521 A1* 6/2019 Liu ....................... H04L 5/0098

FOREIGN PATENT DOCUMENTS

JP 3246718 B2 2/2002

* cited by examiner

*Primary Examiner* — Nizam U Ahmed
(74) *Attorney, Agent, or Firm* — Seager, Tufte & Wickhem, LLP

(57) ABSTRACT

An approach talking about orthogonal frequency hopping patterns definition and a unique way of defining hopping patterns for a time division multiple access (TDMA) wireless sensor networks doing frequency hopping. A frequency hopping pattern may cover virtually any frequency usage for each sensor and handle interference in wireless medium reliably. One may define various orthogonal hopping patterns which are non-interfered between multiple sensor networks present in the same vicinity. One may use TDMA networks for frequency hopping. To make the communication of multiple FTDMA wireless networks work concurrently without much packet collision with greater than 99 percent reliability, one may devise a unique way of generating a frequency hopping pattern (FHP) scheme in various licensed and license free frequency bands. An FHP may be a sequence of n frequencies which is followed by the whole wireless mesh, and the sequence keeps repeating after the nth time slot.

19 Claims, 17 Drawing Sheets

31

32

| Slot No/ Seconds | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 96 | 97 | 98 | 99 | 100 |
|---|---|---|---|---|---|---|---|---|---|---|---|---|---|---|---|---|---|---|---|---|---|---|---|---|---|---|---|---|---|---|---|
| 1 | 0 | 1 | 2 | 3 | 4 | 5 | 6 | 7 | 8 | 9 | 10 | 11 | 12 | 0 | 1 | 2 | 3 | 4 | 5 | 6 | 7 | 8 | 9 | 10 | 11 | 12 | 4 | 5 | 6 | 7 | 8 |
| 2 | 9 | 10 | 11 | 12 | 0 | 1 | 2 | 3 | 4 | 5 | 6 | 7 | 8 | 9 | 10 | 11 | 12 | 0 | 1 | 2 | 3 | 4 | 5 | 6 | 7 | 8 | 0 | 1 | 2 | 3 | 4 |
| 3 | 5 | 6 | 7 | 8 | 9 | 10 | 11 | 12 | 0 | 1 | 2 | 3 | 4 | 5 | 6 | 7 | 8 | 9 | 10 | 11 | 12 | 0 | 1 | 2 | 3 | 4 | 9 | 10 | 11 | 12 | 0 |
| 4 | 1 | 2 | 3 | 4 | 5 | 6 | 8 | 8 | 9 | 10 | 11 | 12 | 0 | 1 | 2 | 3 | 4 | 5 | 6 | 7 | 8 | 9 | 10 | 11 | 12 | 0 | 5 | 6 | 7 | 8 | 9 |
| 5 | 10 | 11 | 12 | 0 | 1 | 2 | 3 | 4 | 5 | 6 | 7 | 8 | 9 | 10 | 11 | 12 | 0 | 1 | 2 | 3 | 4 | 5 | 6 | 7 | 8 | 9 | 1 | 2 | 3 | 4 | 5 |
| 6 | 6 | 7 | 8 | 9 | 10 | 11 | 12 | 0 | 1 | 2 | 3 | 4 | 5 | 6 | 7 | 8 | 9 | 10 | 11 | 12 | 0 | 1 | 2 | 3 | 4 | 5 | 10 | 11 | 12 | 0 | 1 |
| 7 | 2 | 3 | 4 | 5 | 6 | 7 | 8 | 9 | 10 | 11 | 12 | 0 | 1 | 2 | 3 | 4 | 5 | 6 | 7 | 8 | 9 | 10 | 11 | 12 | 0 | 1 | 6 | 7 | 8 | 9 | 10 |
| 8 | 11 | 12 | 0 | 1 | 2 | 3 | 4 | 5 | 6 | 7 | 8 | 9 | 10 | 11 | 12 | 0 | 1 | 2 | 3 | 4 | 5 | 6 | 7 | 8 | 9 | 10 | 2 | 3 | 4 | 5 | 6 |
| 9 | 7 | 8 | 9 | 10 | 11 | 12 | 0 | 1 | 2 | 3 | 4 | 5 | 6 | 7 | 8 | 9 | 10 | 11 | 12 | 0 | 1 | 2 | 3 | 4 | 5 | 6 | 11 | 12 | 0 | 1 | 2 |
| 10 | 3 | 4 | 5 | 6 | 7 | 8 | 9 | 10 | 11 | 12 | 0 | 1 | 2 | 3 | 4 | 5 | 6 | 7 | 8 | 9 | 10 | 11 | 12 | 0 | 1 | 2 | 7 | 8 | 9 | 10 | 11 |
| 11 | 12 | 0 | 1 | 2 | 3 | 4 | 5 | 6 | 7 | 8 | 9 | 10 | 11 | 12 | 0 | 1 | 2 | 3 | 4 | 5 | 6 | 7 | 8 | 9 | 10 | 11 | 3 | 4 | 5 | 6 | 7 |
| 12 | 8 | 9 | 10 | 11 | 12 | 0 | 1 | 2 | 3 | 4 | 5 | 6 | 7 | 8 | 9 | 10 | 11 | 12 | 0 | 1 | 2 | 3 | 4 | 5 | 6 | 7 | 12 | 0 | 1 | 2 | 3 |
| 13 | 4 | 5 | 6 | 7 | 8 | 9 | 10 | 11 | 12 | 0 | 1 | 2 | 3 | 4 | 5 | 6 | 7 | 8 | 9 | 10 | 11 | 12 | 0 | 1 | 2 | 3 | 8 | 9 | 10 | 11 | 12 |
| 14 | 0 | 1 | 2 | 3 | 4 | 5 | 6 | 7 | 8 | 9 | 10 | 11 | 12 | 0 | 1 | 2 | 3 | 4 | 5 | 6 | 7 | 8 | 9 | 10 | 11 | 12 | 4 | 5 | 6 | 7 | 8 |
| 15 | 9 | 10 | 11 | 12 | 0 | 1 | 2 | 3 | 4 | 5 | 6 | 7 | 8 | 9 | 10 | 11 | 12 | 0 | 1 | 2 | 3 | 4 | 5 | 6 | 7 | 8 | 0 | 1 | 2 | 3 | 4 |
| 16 | 5 | 6 | 7 | 8 | 9 | 10 | 11 | 12 | 0 | 1 | 2 | 3 | 4 | 5 | 6 | 7 | 8 | 9 | 10 | 11 | 12 | 0 | 1 | 2 | 3 | 4 | 9 | 10 | 11 | 12 | 0 |
| 17 | 1 | 2 | 3 | 4 | 5 | 6 | 7 | 8 | 9 | 10 | 11 | 12 | 0 | 1 | 2 | 3 | 4 | 5 | 6 | 7 | 8 | 9 | 10 | 11 | 12 | 0 | 5 | 6 | 7 | 8 | 9 |
| 18 | 10 | 11 | 12 | 0 | 1 | 2 | 3 | 4 | 5 | 6 | 7 | 8 | 9 | 10 | 11 | 12 | 0 | 1 | 2 | 3 | 4 | 5 | 6 | 7 | 8 | 9 | 1 | 2 | 3 | 4 | 5 |
| 19 | 6 | 7 | 8 | 9 | 10 | 11 | 12 | 0 | 1 | 2 | 3 | 4 | 5 | 6 | 7 | 8 | 9 | 10 | 11 | 12 | 0 | 1 | 2 | 3 | 4 | 5 | 10 | 11 | 12 | 0 | 1 |
| 20 | 2 | 3 | 4 | 5 | 6 | 7 | 8 | 9 | 10 | 11 | 12 | 0 | 1 | 2 | 3 | 4 | 5 | 6 | 7 | 8 | 9 | 10 | 11 | 12 | 0 | 1 | 6 | 7 | 8 | 9 | 10 |
| 21 | 11 | 12 | 0 | 1 | 2 | 3 | 4 | 5 | 6 | 7 | 8 | 9 | 10 | 11 | 12 | 0 | 1 | 2 | 3 | 4 | 5 | 6 | 7 | 8 | 9 | 10 | 2 | 3 | 4 | 5 | 6 |
| 22 | 7 | 8 | 9 | 10 | 11 | 12 | 0 | 1 | 2 | 3 | 4 | 5 | 6 | 7 | 8 | 9 | 10 | 11 | 12 | 0 | 1 | 2 | 3 | 4 | 5 | 6 | 11 | 12 | 0 | 1 | 2 |
| 23 | 3 | 4 | 5 | 6 | 7 | 8 | 9 | 10 | 11 | 12 | 0 | 1 | 2 | 3 | 4 | 5 | 6 | 7 | 8 | 9 | 10 | 11 | 12 | 0 | 1 | 2 | 7 | 8 | 9 | 10 | 11 |
| 24 | 12 | 0 | 1 | 2 | 3 | 4 | 5 | 6 | 7 | 8 | 9 | 10 | 11 | 12 | 0 | 1 | 2 | 3 | 4 | 5 | 6 | 7 | 8 | 9 | 10 | 11 | 3 | 4 | 5 | 6 | 7 |
| 25 | 8 | 9 | 10 | 11 | 12 | 0 | 1 | 2 | 3 | 4 | 5 | 6 | 7 | 8 | 9 | 10 | 11 | 12 | 0 | 1 | 2 | 3 | 4 | 5 | 6 | 7 | 12 | 0 | 1 | 2 | 3 |
| 26 | 4 | 5 | 6 | 7 | 8 | 9 | 10 | 11 | 12 | 0 | 1 | 2 | 3 | 4 | 5 | 6 | 7 | 8 | 9 | 10 | 11 | 12 | 0 | 1 | 2 | 3 | 8 | 9 | 10 | 11 | 12 |

33

FIG. 3

41

| Group | G1 | | | | | G2 | | | | | G3 | | | | | |
|---|---|---|---|---|---|---|---|---|---|---|---|---|---|---|---|---|
| Freq | 11 | 12 | 13 | 14 | 15 | 16 | 17 | 18 | 19 | 20 | 21 | 22 | 23 | 24 | 25 | 26 |

42

| | | | | | | | | | | | | |
|---|---|---|---|---|---|---|---|---|---|---|---|---|
| 11 | 17 | 21 | 15 | 20 | 14 | 22 | 16 | 25 | 15 | 23 | 19 | 24 |

FIG. 4

71

| | | | | | | | | | | | | | |
|---|---|---|---|---|---|---|---|---|---|---|---|---|---|
| Subnet 1 | 2 | 9 | 13 | 5 | 12 | 7 | 14 | 3 | 10 | 8 | 4 | 11 | 0 |
| Subnet 2 | 9 | 5 | 7 | 8 | 0 | 11 | 2 | 13 | 12 | 14 | 10 | 4 | 3 |
| Subnet 3 | 13 | 7 | 10 | 11 | 9 | 12 | 3 | 4 | 8 | 5 | 14 | 0 | 2 |
| Subnet 4 | 5 | 3 | 11 | 13 | 14 | 4 | 9 | 7 | 0 | 2 | 12 | 10 | 8 |
| Subnet 5 | 12 | 0 | 9 | 147 | 11 | 5 | 8 | 2 | 7 | 4 | 13 | 3 | 10 |
| Subnet 6 | 7 | 11 | 12 | 4 | 5 | 0 | 13 | 10 | 8 | 3 | 2 | 14 | 9 |
| Subnet 7 | 14 | 2 | 3 | 9 | 8 | 13 | 0 | 5 | 4 | 12 | 11 | 7 | 10 |
| Subnet 8 | 3 | 8 | 4 | 7 | 2 | 10 | 5 | 11 | 14 | 9 | 0 | 12 | 13 |
| Subnet 9 | 10 | 12 | 2 | 0 | 7 | 9 | 4 | 14 | 13 | 11 | 8 | 5 | 3 |
| Subnet 10 | 0 | 14 | 5 | 2 | 4 | 3 | 12 | 8 | 11 | 10 | 7 | 13 | 9 |
| Subnet 11 | 4 | 10 | 8 | 12 | 13 | 2 | 11 | 0 | 3 | 7 | 5 | 9 | 14 |
| Subnet 12 | 8 | 4 | 0 | 10 | 3 | 14 | 7 | 12 | 5 | 13 | 9 | 2 | 11 |

FIG. 7

FREQUENCY HOPPING TECHNIQUE FOR MULTIPLE FREQUENCY BANDS IN NETWORKS

BACKGROUND

A present disclosure may relate to communication devices and particularly to wireless devices.

SUMMARY

A wireless communication may occur in a specific frequency band. Each frequency band may be divided into multiple frequencies/channels based on communication needs like bandwidth, data rate, distance, and so forth. Frequency hopping may be a general practice in virtually any FTDMA (frequency hopping time division multiple access) network which can help in avoiding a collision and having multiple devices in the same network or in different networks doing concurrent communications.

A sensor mesh network may consist of multiple devices talking to a common gateway. There may always be a limitation on the number of sensors that a gateway can support based on its hardware capacity and wireless network parameters. In a commercial building, hotel or airport, there may be always a need for wireless networks to support thousands of devices. To achieve that, one will need to have multiple wireless TDMA networks formed independently, each network having one wireless gateway node, having all wireless independent networks using the same frequency hopping pattern in the FTDMA mesh network could potentially create lots of wireless traffic thereby having more packet collisions resulting in packet failures and packet re-transmission thereby reducing the battery life and impacting the packet latency as well.

To make the communication of multiple TDMA networks work concurrently without much packet collision, one may devise a unique way of generating the frequency hopping patterns (FHPs) which are orthogonal and/or different from each other's independent networks. An FHP is a sequence of 1 to n frequencies, which is followed by all the nodes in a single wireless mesh. The first timeslot uses a 1st frequency, the 2nd time slot uses a 2nd frequency and the nth time slot uses nth frequency in the frequency hopping pattern. It may keep repeating from 1st frequency after the nth time slot. In general, each TDMA wireless network may use a pre-defined/randomly defined FHP uniquely assigned or derived per gateway/network. When a multiple network is operating using multiple frequency hopping patterns or a single frequency hopping pattern, there may be always a chance for these networks to use the same frequency at the same time slot thus creating transmit failures. The transmit failures may occur more often when the same FHP is used by many of the systems. If they use different hopping patterns, there is less likely chance that the frequencies can collide but still there is some chance of collisions.

To overcome these issues in today's multiple FTDMA based networks operating in same geographic area, which are prone to many collisions, one may usually recommend following workarounds to resolve those issues. They may consist of a carrier-sense multiple access (CSMA) based network, reduced wireless traffic networks by reducing the sensor data update rate when compared to wired devices, networks deployed with constraints such that networks are mostly separated, thereby packets from one network are not seen on the other network. The present solution should solve an issue of deploying multiple gateways or wireless meshes in the same building or area, and then one does not need to work around the issues anymore.

BRIEF DESCRIPTION OF THE DRAWING

FIG. 3 is a table where one can change the frequency count and see how the pattern changes;

FIG. 4 is a diagram where one may group five or so channels into one group, thereby forming three groups for observation;

FIG. 7 is a diagram of an example of FHP patterns generated for twelve different subnets;

DESCRIPTION

The present approach may talk about orthogonal frequency hopping patterns definition and a unique way of defining hopping patterns for TDMA wireless sensor networks doing frequency hopping. A frequency hopping pattern may cover every frequency usage for each sensor and handle interference in wireless medium reliably. One may define various orthogonal hopping patterns which are non-interfered between multiple sensor networks present in the same vicinity.

The present approach may use TDMA networks for frequency hopping. One may note technical benefits and business advantages of the present approach. To make the communication of multiple FTDMA wireless networks work concurrently without much packet collision with greater than 99 percent reliability, one may devise a unique way of generating a frequency hopping pattern (FHP) scheme in various license free frequency bands (e.g., 2.4 GHz, 915 MHz, 868 MHz). An FHP may be a sequence of n frequencies which is followed by whole wireless mesh, and the sequence may keep repeating after the nth time slot. The letter n may be a whole positive number that indicates a count of a total number of time slots and corresponding frequencies used by the slots.

One may define a frequency hopping pattern based on a uniquely identified hopping length, which automatically shifts its frequency in virtually every wireless communication slot, It may enable wireless nodes to communicate in virtually all the frequency channels within the selected frequency band to avoid interference due to one or two channels meeting certain established standards, regulations and/or requisites.

The present approach may also reveal different frequency hopping patterns that are called orthogonal hopping patterns, of which none has appeared to collide with hopping patterns usable across multiple systems in the same physical area, and yet none seems to have collided among different networks. The present approach is unique way of generating the orthogonal frequency hopping patterns in different-frequency bands. The present approach may be applied across any frequency band and with any number of channels. By doing so, one may expand the TDMA based sensor network within the same proximity.

Figure 1:
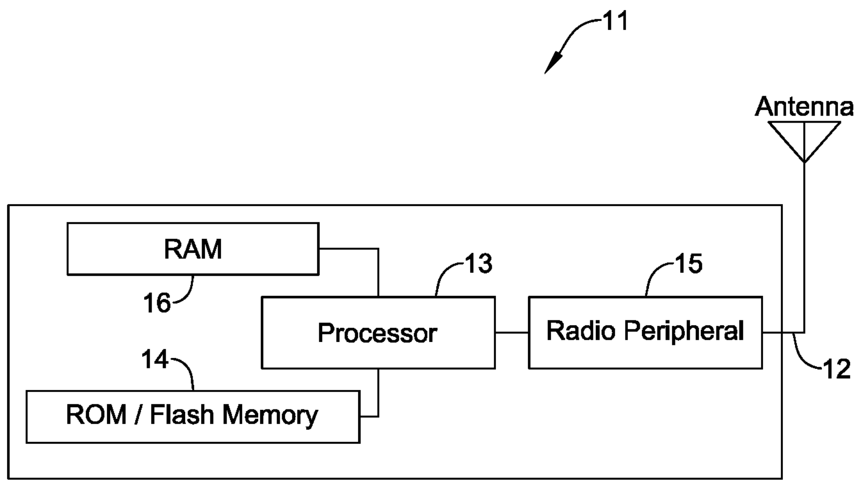
FIG. 1 is a block diagram of the basic components used in a hardware board to execute logic.

FIG. 1 is a block diagram 11 of the basic components used in a hardware board to execute logic. Each board in the mesh may need these components; however, based on the role that they are expected to perform, the components may be called a gateway, router or node. A gateway node may be typically a decision maker of a mesh and may interface the mesh to the external world. Decisions of gateway and data generated may be transmitted between nodes. Some nodes called router nodes may have an extra capability to act as a link between a gateway and a simpleton node.

The basic components required in the hardware board to execute the logic are explained in the figure shown.

Gateway node 12 may be the decision maker of the mesh and interface the mesh to the external world. The decisions of gateway 12 and data generated may be transmitted between nodes. A processor 13 may execute the FHP logic stored in a flash memory or ROM 14 and may generate a pattern which will be communicated to nodes using a radio peripheral 15 and stored inside the nodes. RAM 16 may store one or more applications to help operate the present system.

Processor 13 may run logic to switch a frequency used after each slot is executed. Processor 13 may configure radio peripheral 15 to enter transmit (TX), receive (RX) or sleep mode every time the slot changes. Processor 13 may configure the TX/RX frequency for the slot based on an FH sequence algorithm. Processor 13 may store statistics of a successful TX/RX in RAM 16 which may be used to identify failures. These failures may be periodically transmitted to gateway device 12. Logic stored in RAM 16 of gateway node may be different. ROM 14 may have logic to utilize the failure statistics to identify frequency related issues and make adjustments to FHP used. Roles of ROM 14 and RAM 16 may be interchangeable.

Figure 2:
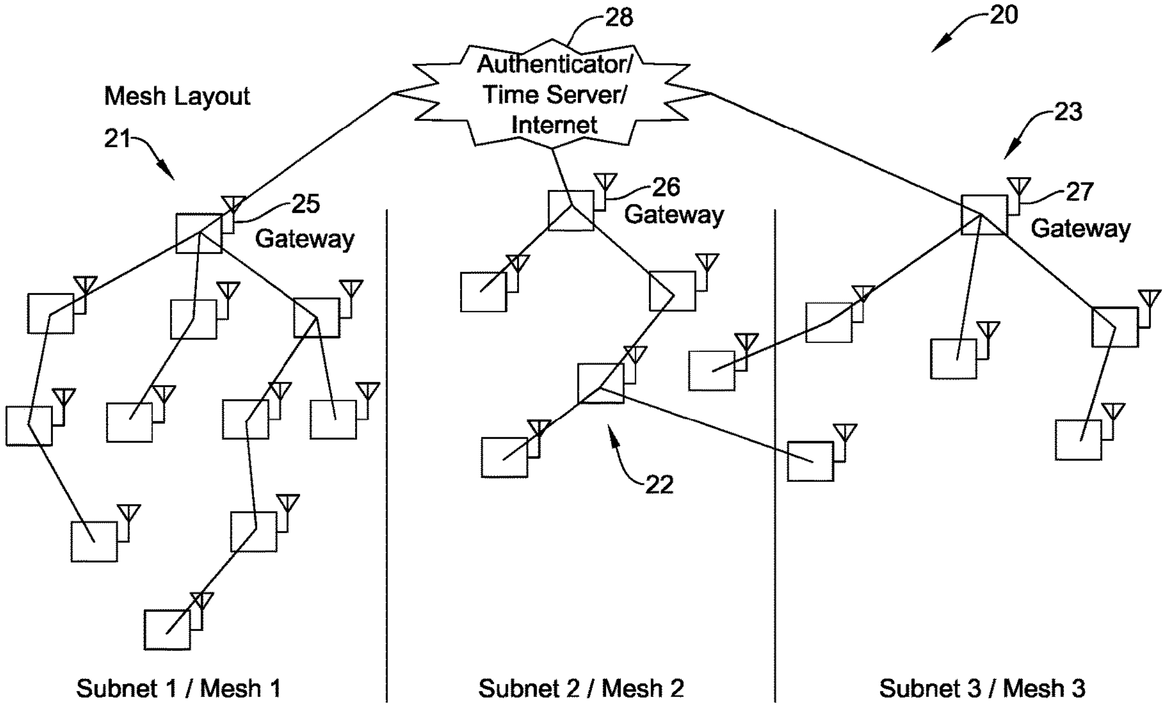
FIG. 2 is a diagram of a mesh layout of subnets.

FIG. 2 is a diagram of a mesh layout 20 of subnets. Each subnet may be well separated like subnet 21 and subnet 22. Some subnets may be in the range of other subnets like subnet 22 and subnet 23. Subnets may be referred to as meshes. Each gateway 25, 26 and 27, respectively, of subnet 21, 22 and 23 may be connected to an authenticator/time server/Internet 28. The remaining nodes are routers/nodes.

A frequency band and frequency channels may be noted. The present approach may generally consider license free frequency bands used worldwide but not necessarily be limited to only license free bands. Popular license free bands may include 2400-2483 MHz, 902-928 MHz, 863-870 Mhz bands. Each frequency band may be divided into multiple frequency channels to communicate between wireless nodes in a mesh network. The entire band may not necessarily be used at a time since these may be license free bands used by many people at the same time; so, only small band may be used by one device at any time.

Channel bandwidth and data rates may be defined by a standards body/set of regulations to meet a min/max channel bandwidth and data rates. For instance, IEEE 802.15.4 may be defined as a 2.4 GHz frequency band split into 16 channels of 5 MHz each; there may be channels 11 to 26 with data rate of 250 kbps. 902-928 Mhz can be divided into 52 channels with a 500 Khz band; 863-870 MHz may be divided into 14 maximum channels with a 500 Khz band.

A frequency hopping pattern (FHP) may be noted. A sequence of frequency channels may be derived from supported frequency channels in that frequency band is a group for devices to communicate. The sequence may repeat once it is used and may repeat and continue indefinitely. An example of FHP in 2.4 GHz may be 13, 18, 22, 11, 21, 15, 17, 25, 23, 12, 16, 19, 24, 14, 20.

The lengths (i.e., numbers of channels) of the FHP are not necessarily fixed. They may be defined by design, and can be 13 or 14, or maximum channels.

There may be a TDMA with a frequency hopping pattern. TDMA may be a list of time slots. Each slot may be of a duration, say for example, 10 msec can be used to communicate between two devices. A frequency channel may be used in that particular slot for communication. Slot 1 may use a frequency channel 1 in the FHP; slot 2 may use frequency channel 2 in FHP, and so on. If an FHP length is 15 channels, then slot 15 may use frequency channel 15 in FHP; and slot 16 may use frequency channel 1 (a repeat from the channel in FHP). This sequence may continue indefinitely.

In a time-synchronized TDMA network, if any two pairs of devices communicate to each other in the same time slot and same frequency channel, they may collide with each other, which proves that they are in close proximity. This event may occur in the same network or different wireless networks. If this event occurs within the same network, a gateway node which is allocated the time slots may know that such an issue can happen, and that the gateway node may adjust the time slots accordingly to avoid interference.

If two independent wireless networks are working in the same geographical area and are managed by two different gateway nodes, it may be difficult to control the time slot or frequency channel allocation since they both are independent wireless networks. A list of orthogonal frequency hopping patterns used in different networks may resolve such an issue. A wireless node should use all the frequency channels in the frequency hopping pattern over time to avoid any interference/blockage issues present in a few sets of channels.

Orthogonal frequency hopping may be noted. (The present approach may indicate that one try to use all frequency channels in every slot by choosing the correct number of frequency channels to form an FHP. The number may be chosen such that the least common factor (LCF) of a number of slots in a base interval of the network (i.e., super frame) and the number of frequencies in the FHP, be 1.

One may consider a 2.4 GHz 802.15.4 network where there are 16 frequencies that can be used by the network. Since this is a 16-frequency band and a 1 second super frame system which comprises of 100 slots (each slot size is 10 millisecond), an assumption here may be that the network uses minimum and multiples of 100-slots or super frames. One may choose 13 channels for forming any FHP, as the highest number of frequency channels in that band, that one can use a least common factor (LCF of 13 (13, 1) and 100 (5, 5, 2, 2, 1) is 1. By doing so, the time slots may always use all the 13 frequencies before repeating the same. One may also have 11, 9, 7 and 3 frequency channels used, but they can repeat the pattern earlier or in less time. That is, a 3 channel FHP system may repeat the same frequency at slot 1 after 300 slots or 3 seconds. Thus, choosing 13 frequencies can repeat the same frequency seen in slot 1 only after 13 slots. The first row 32 and first column 33 indicate header row/column, respectively, of image 31. This may be seen in an image 31 shown in FIG. 3 as well where one can change the frequency count and see how the pattern changes.

Time-based interference is something which may happen on a frequency at a repeating interval. In general, these intervals may be 1 s, 2 s, 4 s, and so on, until 2 power n ($2^n$) second. This type of interference may be easily overcome by the present FHP, because at any arbitrary interval of time, one may have unique frequencies used until the maximum frequencies are reached. The 13 channels may keep on repeating.

One may have evaded the time-based interference on a frequency to some extent. This approach may still be improved by adding a deterministic random offset to the FHP after it completes each cycle of its unique execution, which may be derived from being based on a factor of a number of frequencies or repetition interval seconds, absolute slot number (ASN), and so forth.

A 13 channel FHP may repeat after 13 seconds. One may consider a deterministic random number generator (DRNG) function which outputs a value based on an ASN (absolute slot number) as an input. Since the ASN may be the same across the network and unique in time, one may now have a unique random number offset added across the network after each unique cycle, and thus one may easily achieve a completely randomized FHP which will not necessarily repeat after any number of seconds. For example, one may have: 1) A next frequency to be used (Fn)=FHP[MOD{(n+DRNG(0, SubnetId)), NumberOfFreq}], where n is a current slot number; and 2) The above noted function may be an example of executing the FHP in that such the pattern is not necessarily repeated in time and is randomized, which may also ensure that any frequency will not necessarily repeat itself in time for any chosen fixed interval.

In case of a channel interference, the devices in the network may note it as a transmit failure upon that frequency. This channel diagnostic may be reported to the gateway on a periodic basis by virtually all the devices in that mesh. The gateway may check on that and if any frequency has more transmit failures, then that frequency would be replaced with a spare frequency in the FHP and the new FHP will be communicated generally to all devices. This way the channel interference is avoided amidst the randomized FHP. It is important to keep 1 or more spare frequency channels not used in FHP to cover for an interference replacement scenario.

An FHP is generally designed with a random or sequential pattern. The present frequency selection methodology however may allow for a deterministic FHP pattern selection which could minimize the amount of interference encountered for any known frequency bands and existing protocols, while ensuring virtually that all frequencies are used and not necessarily repeated across the network at any given time.

Figure 5:
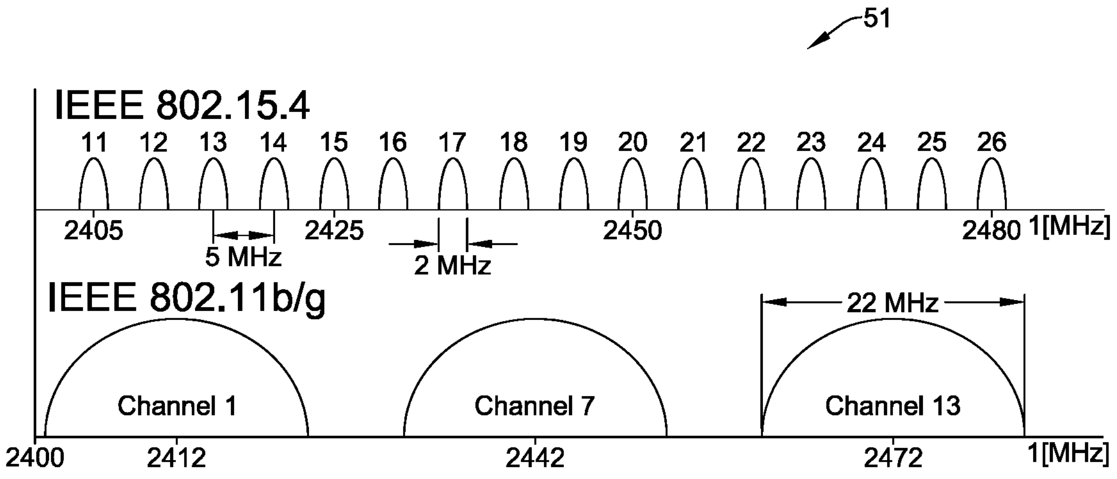
FIG. 5 is a diagram showing different wireless protocols where concurrent communications may lead to transmission failures.

Considering a 2.4 GHz ISM band is where one may have multiple wireless protocols possible to communicate concurrently. Protocols like Wi-Fi, BLE and 802.15.4, shown in part as diagram 51 of FIG. 5, may be competing with or for the same band, though the channel spacing, and modulation techniques might be different. To have better resistance to other channels, one may try to group the channels. For 802.15.4 frequency bands which may have 5 MHz channels that collide with Wi-Fi which has a 20 MHz channel. Thus, one may group 5 channels or so into 1 group, thereby forming 3 groups as shown in diagram 41 of FIG. 4. When forming the 13 channel FHP, as in diagram 42, one should always choose the frequency channels such that any 2 adjacent frequencies are not from the same group in that they are well spaced so that the chance of running into a same channel interference is minimized.

For example, one may make 16 channels into 3 groups. A sample 13 channel FHP would be like G1F1, G2F2, G3F3, G1F5, and so on. It may look like diagram 42. After the $13^{th}$ frequency which is in G3, it may move to a first frequency which is in G1.

One may consider another example of 915 MHz which contains 51 channels. They may be separated into 10 groups or 5 groups based on the other communication interferences. Once one has the groups, the FHP may be created as done for the above condition of 13 frequencies and to ensure that the adjacent frequencies are picked from different groups virtually always.

The FHP generated by the present algorithm may be orthogonally separated across subnets. A subnet ID or mesh number may be used as an input to vary the order of grouping and frequency selection and thus one may ensure that all the different meshes will get a different orthogonal FHP after executing the same algorithm and thus chances of having same frequency at the same time between FHP patterns generated may be very low.

Figure 6:
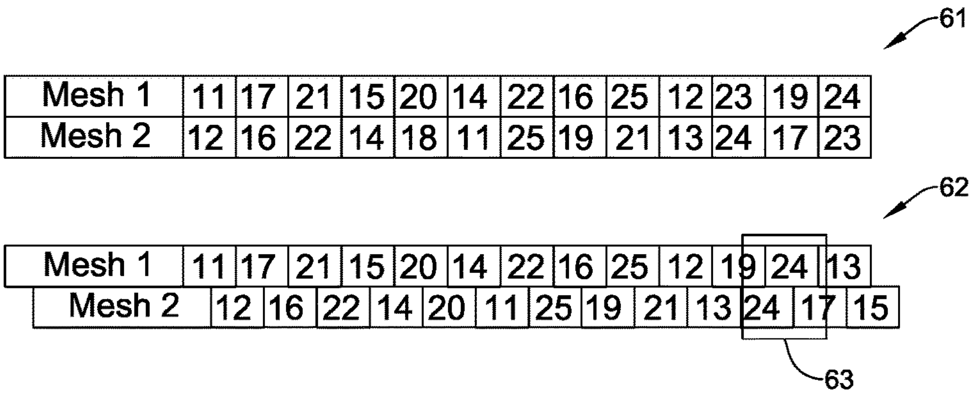
FIG. 6 is a diagram of where networks are not time synced revealing a possibility of a channel of one mesh colliding with a channel of another mesh.

If the meshes are time synced, in case of 1000 s of sensors from a same hotel or commercial building, then one may for sure have near to zero packet collisions with this approach as each mesh is running its own orthogonal FHPs. One may note mesh 61 of FIG. 6.

If the meshes are not time synced between them in that case, there may be a small possibility for time drifted slots using same frequency to collide between the meshes; however, since the hopping patterns are orthogonally distributed, the next channel may be on a different group and that should make the retry packet always succeed.

One may consider the case where the mesh networks are not time synced and thus there is a possibility of channel number 24 of Mesh 1 colliding with channel number 24 of Mesh 2, but the next slots may be totally different channels thereby making good the retransmission to succeed. One may note mesh 62 and its area 63 of FIG. 6.

It may be also possible to run the present FHP algorithm to generate multiple FHP patterns and pick the best ones to use when a number of subnets required is known.

If one needs to pick 13 frequency channels out of 16 available channels, one could generate multiple orthogonal FHPs for different subnets during a design stage and pre-record them in devices. The devices may then use their subnet ID to pick their sequence.

An example of FHP patterns generated for 12 different subnets is given in table 71 in FIG. 7. One may note that the FHP patterns chosen have strong time drift collision avoidance. (Channels 1, 6, 15 may be picked for spares.)

Frequency collisions may occur within the mesh. Frequency collisions within the mesh may happen when two devices try to communicate at the same slot (e.g., slot 5 using frequency channel 15 in mesh 81 of FIG. 8) and they are in range of each other. This may happen because a gateway 83 of device 82 assumed that they were sufficiently far apart. A naïve approach to solve the problem is to react by changing slots used for colliding communications links (link is a pair of devices communicating to each using a frequency channel).

Because of the HOP level, they are assumed to be far from each other; however, this may be a wrong assertion on gateway's part. Gateway 86 may indicate a slot 5 communication 85. Arrow 88 of a device 84 having a gateway 86, may indicate a slot 8 communication 80. An issue may appear when a gateway 83 is overloaded with many nodes such that it is forced to assign same slots for multiple links. Before the correction, both links may use channel (CH) 15. After a gateway 86 added a slot offset of 7, one link may use CH15 and the other may use CH22. Arrow 88 of device 84 having gateway 86, may indicate a slot 5 link employing CH22 instead of CH15 (analogous to slot 8 communication 80).

Figure 8:
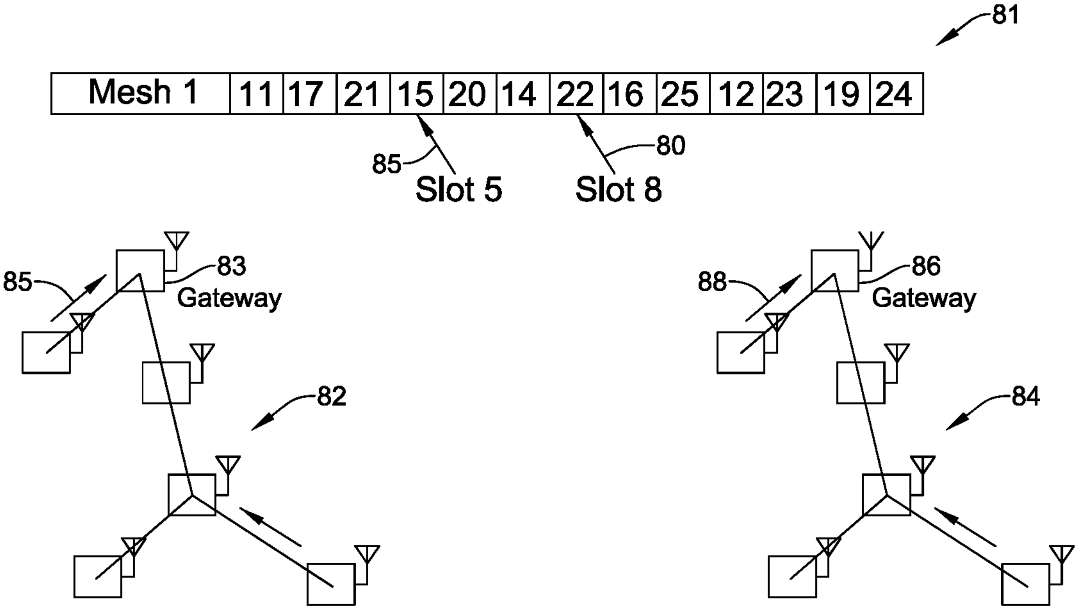
FIG. 8 is a diagram of a frequency collision within a mesh when two devices try to communicate at the same slot.

In FIG. 8, mesh of 82 and mesh with 84 actually are the same mesh at two instances. Mesh 82 is before correction and mesh 84 is after correction with slot offset. Arrow 88 is actually a link which uses frequency channel 22 (which is analogous to slot 8) at slot 5 itself. One may arrive at channel 22 by adding channel gateway-decided offset value 7 to slot 5's frequency channel value of 15.

Figure 9:
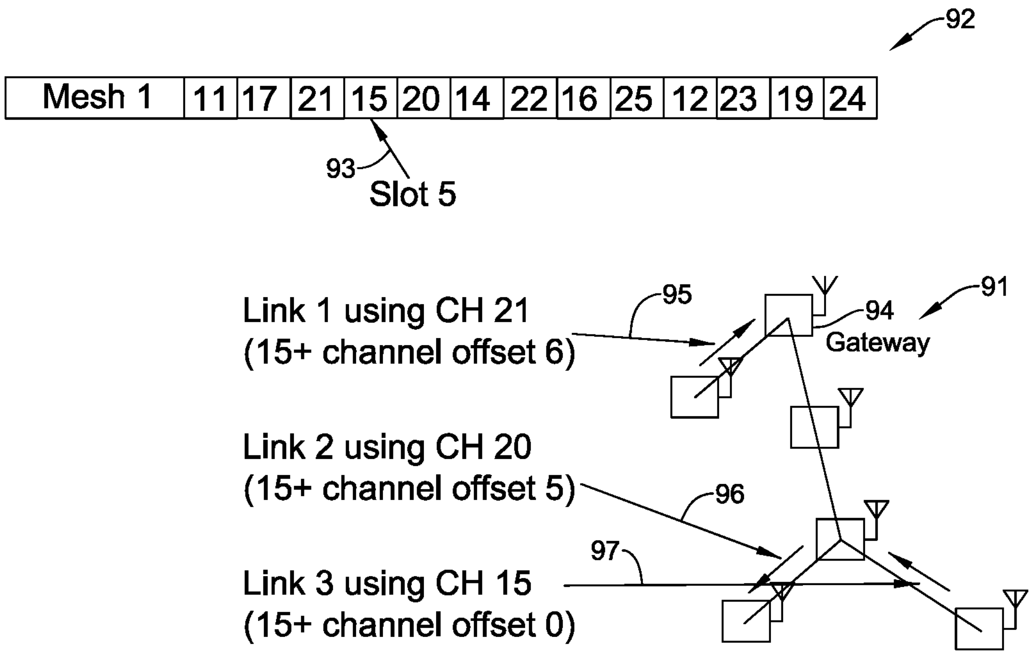
FIG. 9 is a diagram that appears as a snapshot of links within a mesh when executing a slot with a device having a gateway.

An issue with the naïve approach is that it may be a reactive solution, instead a solution indicated in FIG. 9, which suggests an approach of deviating the FHP so that such collisions within the mesh might be avoided. The solution employed here may be to use a channel offset (i.e., a value assigned by gateway for each link) so that even links occurring on the same slot use different frequencies. This however appears not without cost as one may run the risk of offset link of mesh 1 colliding with offset-ed link of mesh 2. However, since the mesh is typically deployed over a vast area, the risk of two links from two meshes just happening to collide appears very low and thus negligible. In the oddest of scenarios, a gateway may kick in the spare channel or adjust the channel offset for that link to avoid a channel collision.

FIG. 9 is a diagram that appears as a snapshot of links within a mesh 92 (1) when executing a slot 93 (5) with an item 91, which may be a wireless mesh consisting of devices such as a gateway node, router nodes, and simpleton nodes (generally called as "nodes" itself) having a gateway 94. There may be a link 1 using a CH 21 (for 15+channel offset 6) at arrow 95. There may be a link 2 using a CH 20 (for 15+channel offset 5) at arrow 96. There may be a link 3 using a CH 15 (for 15+channel offset 0) at arrow 95.

One may form a hop sequence based on various factors. First, a length of the frequency hopping pattern may be derived based on the selected frequency band and the width of the frequency channel (for examples, 2.4 GHz uses 15 channels, 915 Mhz uses 52 channels and 868 MHz uses 15-channels) and generates unique hopping pattern based on the derived hopping length (frequencies used).

Second, a frequency hopping pattern and hopping length may be selected in such a way that every sensor can transmit on every frequency defined in the hopping pattern within a defined time period covering the entire available frequency spectrum.

Third, adding onto the logic, one may also dynamically generate a frequency hopping pattern at runtime based on a network load and channel diagnostics. The length of the hopping pattern may be increased/decreased by changing channel bandwidth resulting in a change of a number of hopping channels and size of the hopping pattern; for instance, based on a load that the subnet could switch to increase the bandwidth used (by reducing a number of channels used) and then transmit more data per TX/RX.

Fourth, frequency channel statistics are monitored for each wireless node continuously and having too many transmission failures in a particular channel in a majority of the wireless nodes will indicate that a channel has an interference; thus, the gateway node identifies and replaces that channel with a spare channel available in the frequency band.

Figure 10:
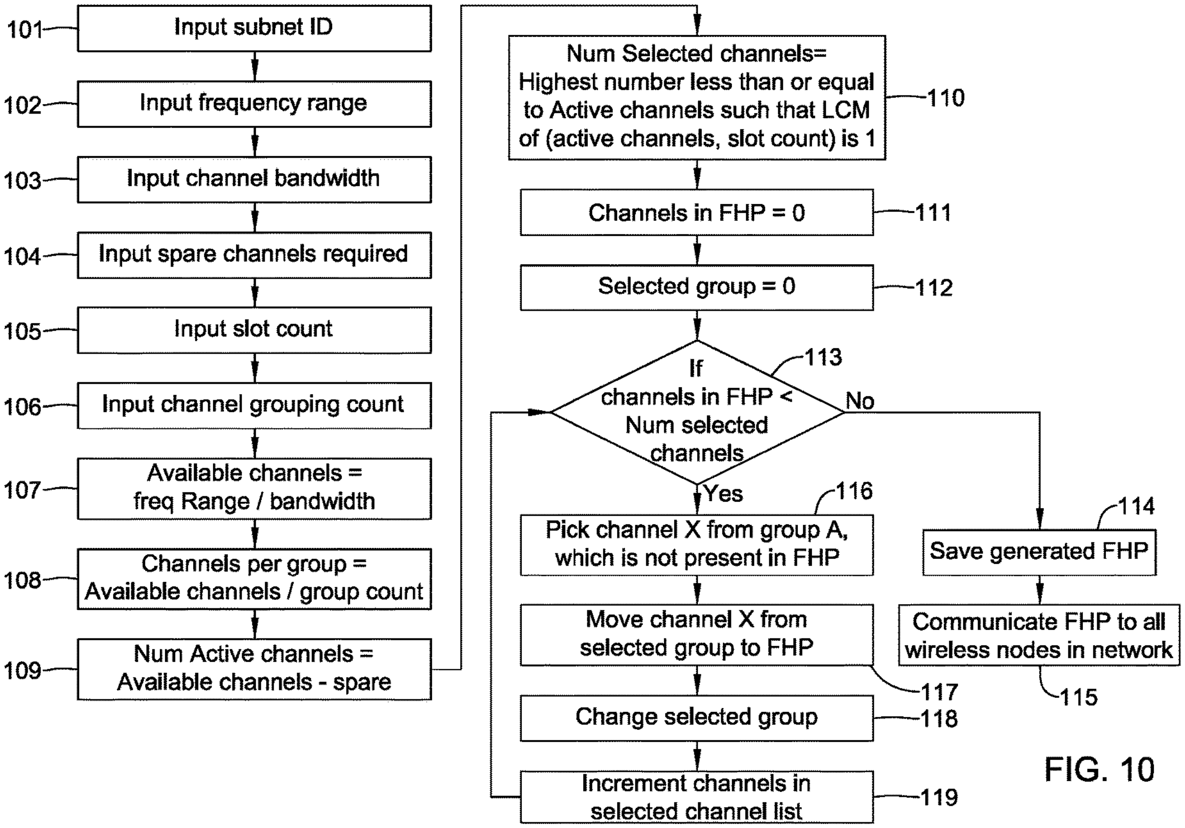
FIG. 10 is a flow diagram for FHP frequency selection.

FIG. 10 is a flow diagram for FHP frequency selection that may be noted. Here, a frequency range, channel bandwidth, channel count, data rate, slot count, and other inputs may start off from their default values and the systems may adjust them at runtime to optimize the communication. Selecting a channel and changing a selected group may be a simple increment or a complex operation utilizing prior knowledge to avoid highly contested frequency ranges for a system's central frequency (2.4 GHZ/868 Mhz/and so on). A subnet ID may be used as a driver for changing the selected group and picking a next frequency so that the FHP is distributed very evenly across multiple meshes.

The diagram of FIG. 10 may show an input subnet ID symbol 101 with an output to an input frequency range symbol 102 with an input channel bandwidth symbol 103 with an output to input spare channels required symbol 104 with an output to an input slot count symbol 105 with an output to an input channel grouping count symbol 106 with an output to input available channels=frequency range/bandwidth symbol 107 with an output to input channels per group=available channels/group count symbol 108 with an output to input num active channels=available channels−a spare symbol 109 with an output as an input to symbol 110 which states num selected channels=highest number less than or equal to active channels such that a least common multiple (LCM) of (active channels, slot count) is 1.

After symbol 110 is a symbol 111 indicating channels in FHP=0 is an output and input to symbol 112 indicating selected group=0. Next a symbol 113 reveals a question if channels in FHP<num selected channels. If the answer is no, then one may save the generated FHP at symbol 114 and communicate FHP to all wireless nodes in the network at symbol 115. If the answer is yes, then pick channel X from group A, which is not present in FHP at symbol 116, which is an output as an input to a symbol 117 that indicates to move channel X from a selected group to FHP. An output of symbol 117 may be an input to symbol 118 that indicates to change the selected group that may be an output to symbol 119 which says to increment channels in the selected channel list. An output from symbol 119 may go to symbol 113 as indicated above.

Figure 11:
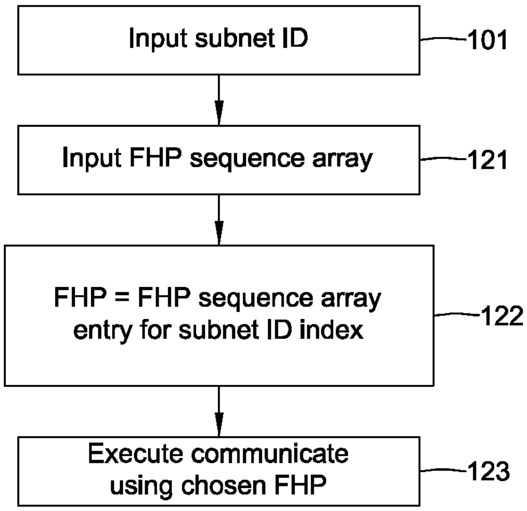
FIG. 11 is a flow diagram for pre-recorded FHP sequences.

FIG. 11 is a flow diagram for pre-recorded FHP sequences. A subnet ID 101 may be input with an output to symbol 121 which may input an FHP sequence array. After symbol 121 may be an FHP sequence array entry for a subnet ID index at symbol 122. One may then execute a communication using a chosen FHP at symbol 123.

In a case, the FHP algorithm may be run before hand and have different FHP sequences and be stored for mesh implementations with a known subnet count. One may employ different logic in the processor to pick the FHP based on a subnet ID. Here, it may be possible to store the FHP sequence in all the nodes and run the same algorithm everywhere. Alternatively, the gateway node could run the algorithm and communicate a chosen FHP to all its underling nodes.

Figure 12:
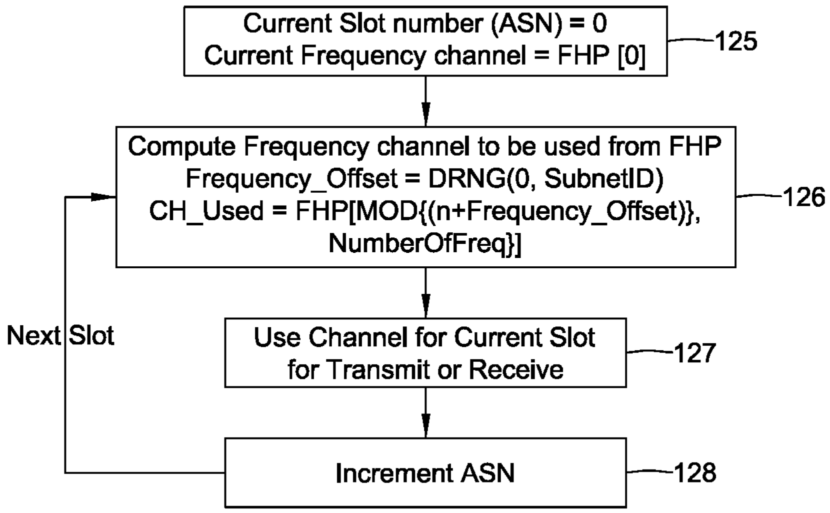
FIG. 12 is a flow diagram of a random offset addition during run time in wireless nodes.

FIG. 12 is a flow diagram of a random offset addition during run time in wireless nodes). At symbol 125, current slot number (ASN)=0, current frequency channel=FHP[0]. One may then compute frequency channel to be used from an FHP, CH_Used=FHP[MOD{(n+Frequency_Offset)), NumberOfFreq}] and where frequency_offset may be calculated as DRNG (0, SubnetId) at symbol 126. One may use the channel for current slot for transmit or receive at symbol 127. At symbol 128, one may Increment the ASN. A next slot indication may go from symbol 128 to symbol 126.

In every time slot, every node may do this logic to compute the frequency channel to be used in the FHP. One may use the computed frequency channel for transmit or receive in that time slot. One may wait for the next time slot to occur, and increment the ASN and recompute the frequency channel to be used in the next time slot. This process may happen in every wireless node in the network for every time slot. Since the subnet ID is the same in virtually all wireless nodes in the network, all wireless nodes in the network may get the same frequency offset. In another wireless network with a different subnet ID, virtually all wireless nodes may have a different frequency offset.

Figure 13:
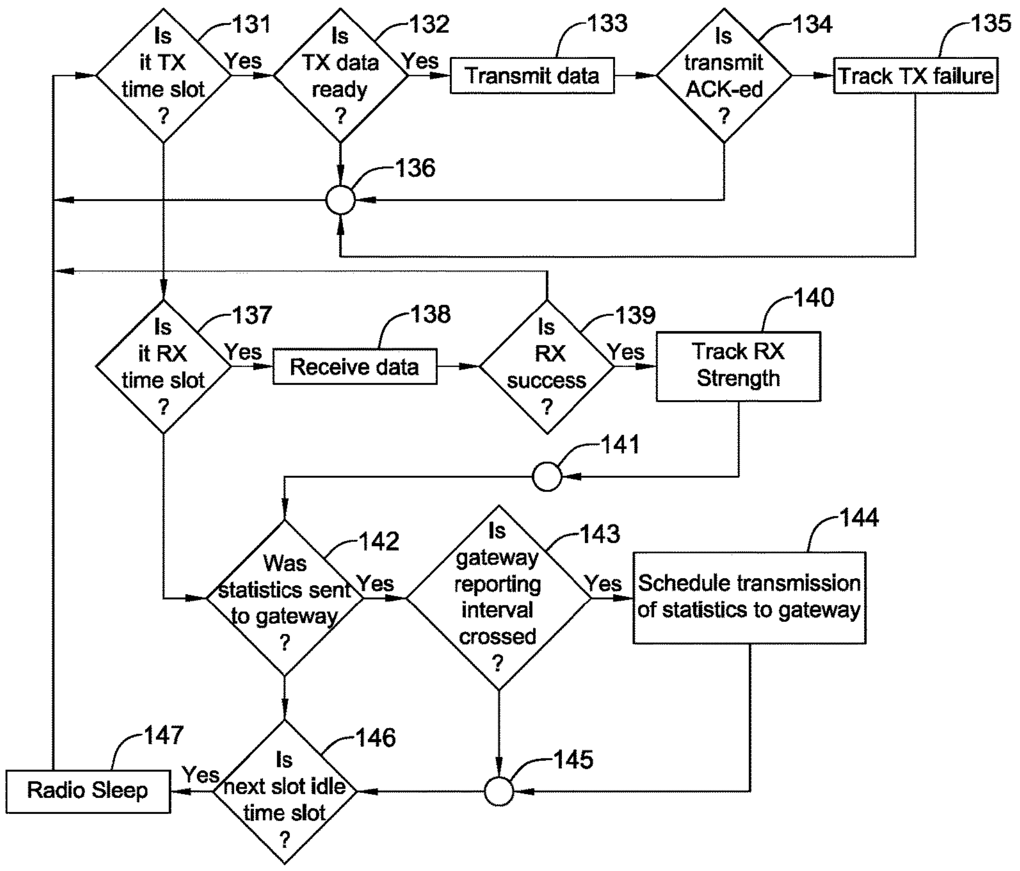
FIG. 13 is a flow diagram for channel interferences tracking in wireless nodes.

FIG. 13 is a flow diagram for channel interferences tracking in wireless nodes. A question at symbol 131 asks whether is it a TX time slot? If the answer is yes, then a question at symbol 132 asks whether is TX data ready? If the answer is yes, then symbol 133 indicates to transmit data. Then symbol 134 asks whether the transmit is ACK-ed? If the answer is yes, then that answer may go to adder symbol 136. If the answer is no, then symbol 135 indicates to track TX failure which goes to adder symbol 136. If an answer at symbol 132 is no, then that answer may go to adder symbol 136. A sum signal from symbol 136 may go to symbol 131 where the question may be answered no, leading to symbol 137 where a question of whether is it an RX time slot. If an answer is yes, then data may be received at symbol 138. Thus, next is whether the RX was a success at symbol 139. If answer is no, then such may be indicated to symbol 131 with the question whether is it a time slot. If the answer to the question at symbol 139 is yes, then the RX strength may be tracked at symbol 140. The track strength of tracking may be sent to symbol 141 where the tracking information is forwarded on to symbol 142, where a question of is asked whether statistics were sent to a gateway. Also, if the answer to the question at symbol 137 is no, then the question 142 may be confirmed or asked again. If an answer is yes at symbol 142, then a question of whether a gateway is reporting if an interval is crossed at symbol 143. If an answer is yes, then a transmission of statistics may be scheduled to the gateway. If the answers are no from symbols 143 and 144, then those answers may go to a junction symbol 145 which may be forwarded to symbol 146. If the answer is no to the question at symbol 142, then that answer may also go to symbol 146. If an answer to a question of whether is a next slot an idle time slot. If an answer is yes, then a radio sleep mode of symbol 147 may occur with that indication going to symbol 131. The above approach may repeat itself with or without variants.

Figure 14:
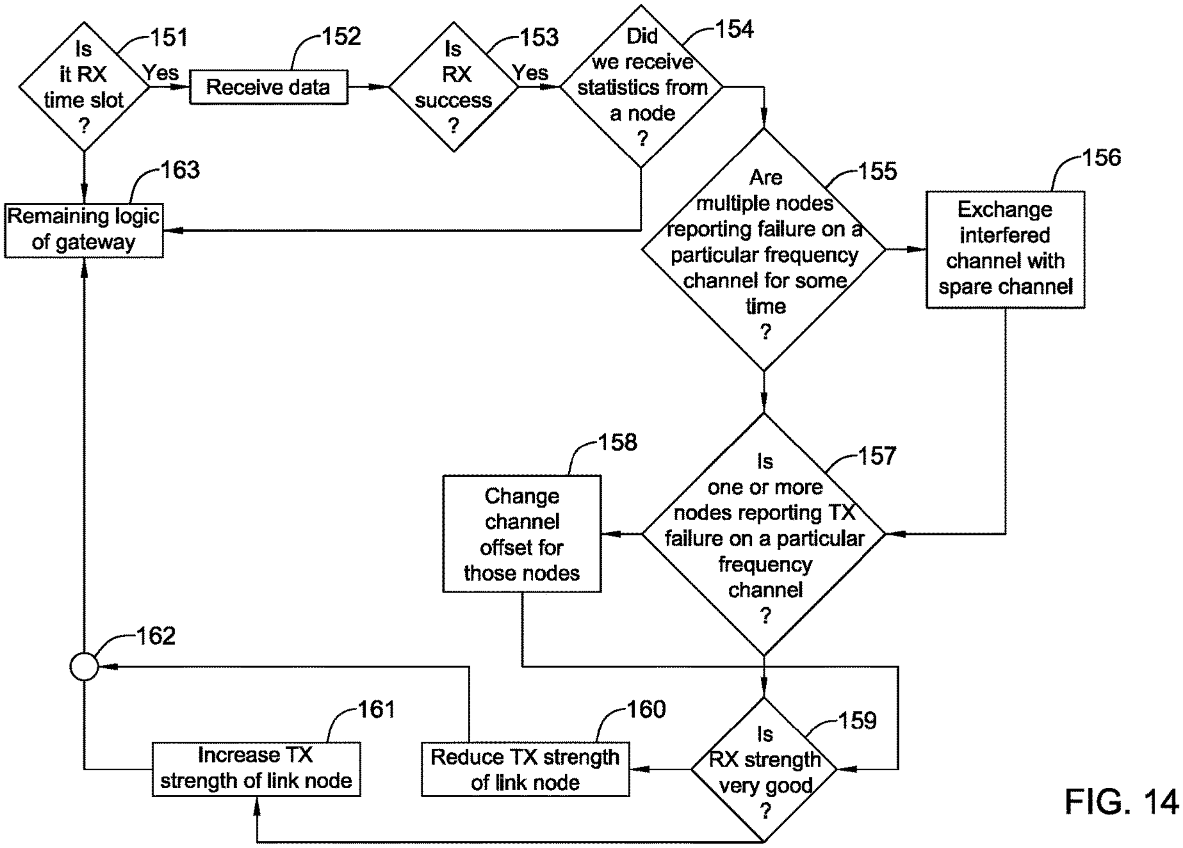
FIG. 14 is a flow diagram for channel interferences tracking in a gateway.

FIG. 14 is a flow diagram for channel interferences tracking in a gateway. Symbol 151 may ask "Is it an RX time slot?" If an answer is yes, data may be received at symbol 152. Symbol 153 may indicate with "Is RX a success?" If yes, then "did one receive statistics from a node?" at symbol 154. If an answer is yes, then a question at symbol 155 may be "Are multiple nodes reporting failure on a particular frequency channel for some time?" If an answer is yes, then "exchange interfered channel with spare channel" is shown at symbol 156. An output from symbol 156 and a no answer from symbol 155 may go to a symbol 157, which may ask if one or two nodes report a TX failure on a particular frequency channel. If an answer is yes, then one may change a channel offset for those nodes at symbol 158. An output from symbol 158 and a no answer from symbol 157 may go to a symbol 159 which has a question "Is RX strength very good?" If an answer is yes, then a symbol 160 of that question indicates to reduce TX strength of a link node. If an answer is no, then a symbol 161 of that question indicates to increase TX strength of the link node. Outputs of symbols 160 and 161 may go to a junction symbol 162. An output of symbol 162 may go to a symbol 163 which may represent "Remaining logic of gateway". Also "no" answers from symbols 151 and 154 may go to symbol 163.

Figure 15:
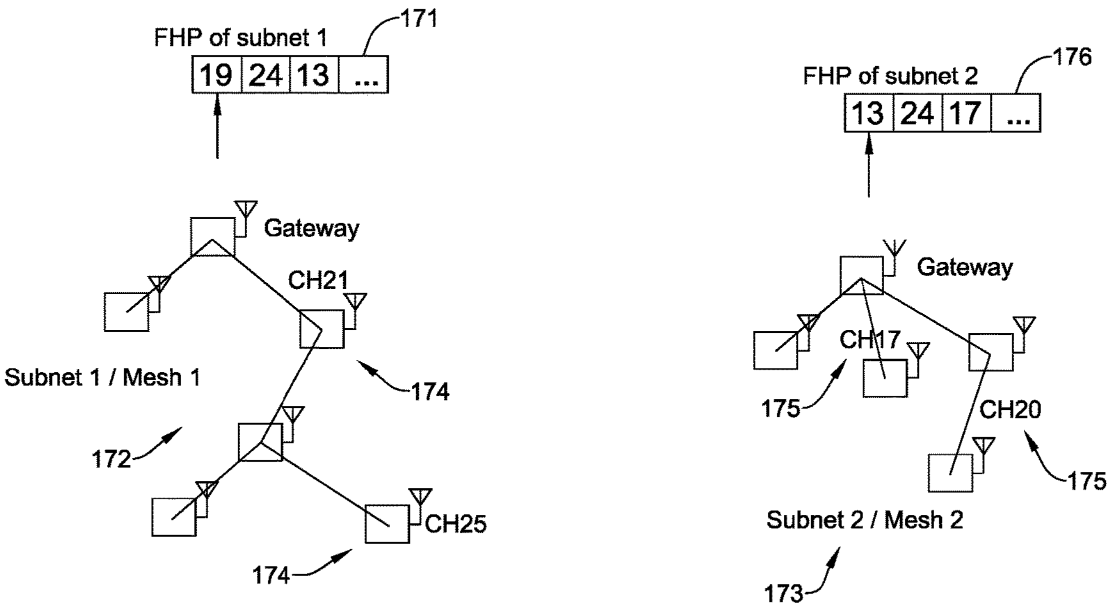
FIG. 15 is a diagram of FHP usage at runtime where a portion of the FHP table is shown for two subnets, both having a similar slot lengths.

FIG. 15 is a diagram of FHP usage at runtime. A portion of the FHP table is shown for two subnets both having a slot length of 10 ms. An FHP of subnet 1 is shown as symbol 171. Device 172 consists of a subset 1/mesh 1. Channel offsets 2 and 6 may be added to FHP for slot 0 (CH19) as shown by arrow indications 174.

An FHP of subnet 2 is shown as symbol 176. Device 173 consists of a subset 2/mesh 2. Channel offsets 4 and 7 may be added to FHP for slot 0 (CH13) as shown by arrow indications 175.

Links within the mesh and between meshes do not necessarily collide in this scenario in that one has good communications.

Frequency usage for ASN=0. An absolute slot number may be the total number of 10 ms slots executed up to this point in time.

Figure 16:
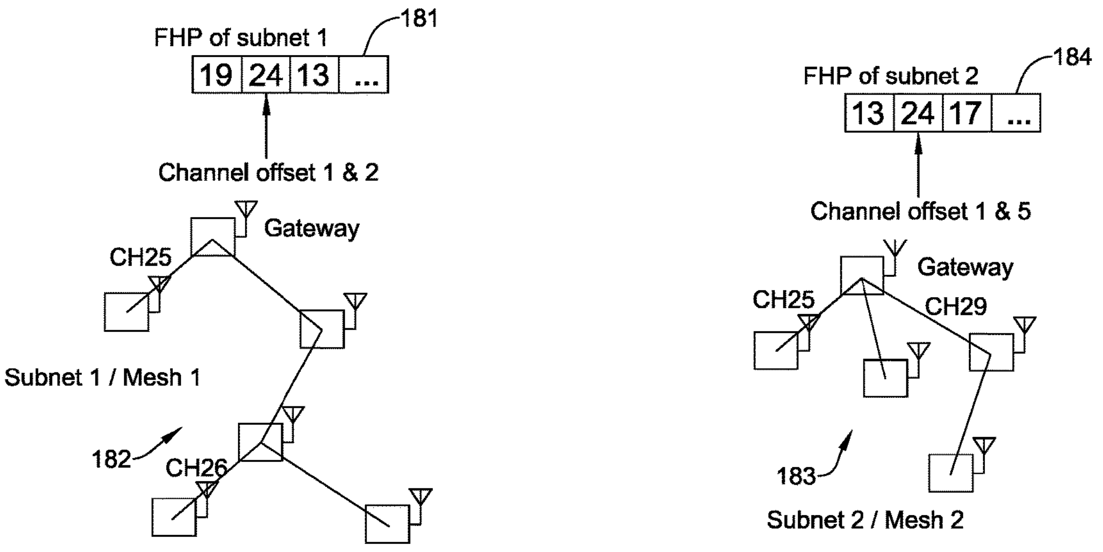
FIG. 16 is another diagram of FHP usage at runtime.

FIG. 16 is another diagram of FHP usage at runtime. An FHP of subnet 1 is shown as symbol 181. Device 182 consists of a subset 1/mesh 1. Channel offset 1 and 2 may be added to FHP 181. Device 183 may consist of subnet 2/mesh 2. Channel offset 1 and 5 may be added to FHP 184. In this scenario, there may be a link in subnet one which uses CH25 and there may be a link in subnet two which uses CH25. If the devices are well separated geographically then they should have good communications. If, however, they are in range of each other, there may be communication failures and the gateway may fix the issue by adjusting channel offset used or by employing a spare channel. Frequency usage for ASN=1. Absolute slot number may be the total number of 10 ms slots executed up to this point in time.

Figure 17:
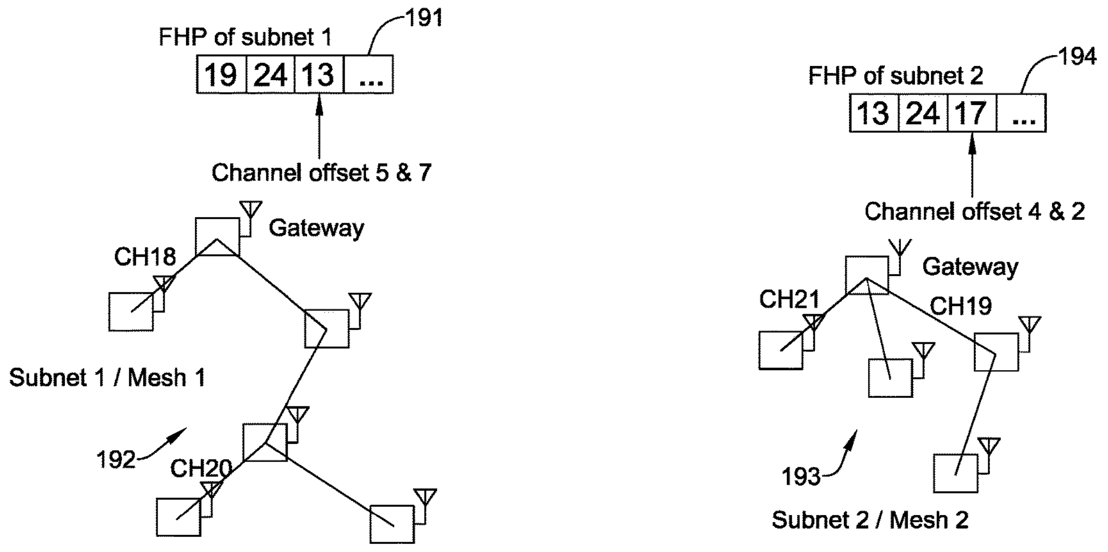
FIG. 17 is still another diagram of FHP usage at runtime.

FIG. 17 is still another diagram of FHP usage at runtime. Device 192 consists of a subset 1/mesh 1. Device 193 consists of a subset 2/mesh 2. Channel offset 5 and 7 may be added to FHP 191. Channel offset 4 and 2 may be added to FHP 194. The channel to be used next may be based on an algorithm and is explained below for subnet 1. A next frequency to be used is (Fn)=FHP[MOD{(n+DRNG(ASN/NumberOfFreq)), NumberOfFreq}]. One may assume a simple DRNG function, DRNG(x)=(x) & NumberOfFreq=13. FHP[MOD{(3+DRNG (3/13)), 13}]=FHP[MOD{3+0, 13}]=FHP[3]=13. Each link may add the channel offset provided by gateway (5 and 7) to this channel, thus resulting in two links using CH18 and CH20. Frequency usage for ASN=3. The absolute slot number may be the total number of 10 ms slots executed up to this point in time.

To recap, a system of frequency hopping may incorporate one or more meshes, each mesh having a hardware unit for receiving and transmitting communications via a gateway, and a generator of a frequency hopping pattern (FHP) consisting of a sequence of frequencies selected from a predetermined frequency band, connected to the gateway of the hardware unit. The gateway may incorporate a processor a random access memory (ROM) connected to the processor, a read only memory connected to the processor, and one or more radio peripherals connected to the processor. There may be receiving and transmitting communications of the hardware unit at a frequency and duration of time of the frequency hopping pattern that are different than a frequency at a duration of time receiving and transmitting communications of a hardware unit of a different mesh, or at a distance great enough between the hardware unit and the hardware unit of a different mesh so as to avoid a collision of receiving and transmitting communications between the hardware unit and the hardware unit of a different mesh even if the latter hardware unit is of the same mesh. Each hardware unit may incorporate one or more wireless sensors. The generator of the frequency hopping pattern for each of the one or more meshes may incorporate a time division multiple access (TDMA) network.

Each gateway may be connected to an authenticator, time server or internet.

A communication of multiple TDMA networking may occur in a specific frequency band.

The specific frequency band may be divided into multiple frequencies/channels based on communication needs for bandwidth, data rate and distance.

The multiple frequencies/channels may be utilized one at a time according to the frequency hopping pattern (FHP) during a communication.

The system may further incorporate a device that generates FHPs which are orthogonal relative to or different from FHPs of other communications independent of the present communication.

An FHP may be a sequence of one to n frequencies not necessarily in a numerical or other order.

An FHP may be a sequence of one to n frequencies having an order that changes over time of the present communication.

In an FHP, a first time slot may use a first frequency, a second time slot may use a second frequency, and an nth time slot may use an nth frequency. The FHP may repeat the first frequency, the second frequency and the nth frequency in that order and format after the nth time slot indefinitely as long as predetermined, needed, required, or desired. "n" may be a whole positive number that indicates a count of a total number of time slots and corresponding frequencies used by the slots.

The FHPs of the present communication may be orthogonal or different from other FHPs so as to avoid a collision with another communication having an overlap of similar FHPs intrusive from nearby geographical areas.

An FHP may be based on a uniquely defined hopping length which automatically shifts its frequency or frequencies in each wireless communication slot. The FHP may enable nodes to communicate in each frequency within a subject frequency band and avoid interference with other frequencies of another frequency band.

A mechanism for frequency hopping may incorporate one or more wireless networks. Each of the one or more wireless networks may incorporate one or more sensors providing a wireless communication. Each wireless communication may occur in a specific frequency band. Each specific frequency band may be divided into multiple frequencies or channels. Frequency hopping may occur to avoid collisions among concurrent communications. Frequency hopping may occur according to an automatically generated frequency hopping pattern (FHP).

The frequency hopping pattern may be a sequence of frequencies.

The sequence of frequencies may be a defined random frequency hopping pattern or a multiple of orthogonal or different frequency hopping patterns on one or more networks. There may be adjustability of one or more parameters of a group comprising frequency hopping pattern, channel bandwidth, channel count, slot count, and data rate at runtime based on mesh requirements or a load.

There may be a generation of a frequency hopping pattern (FHP) scheme in frequency bands.

A system for implementing frequency hopping may incorporate wireless mesh nodes having a processor configured to execute an algorithm or logic, a radio peripheral connected to the processor configured to communicate wirelessly with devices, a gateway node configured to perform gateway specific actions, a router node configured to perform routing between nodes and the gateway, and other nodes configured to send data to the gateway node via router nodes. In each node, the processor may run logic to switch a frequency to another frequency after each slot is executed, and the processor may configure a transmit or receive frequency for a slot based on a frequency hopping sequence algorithm.

The system may further incorporate an algorithm or logic executed by a processor of virtually or nearly all mesh nodes, where statistics can be stored in a random access memory (RAM) for a successful transmit or receive to be used to identify failures.

The system may further incorporate an algorithm or logic which can be executed by virtually or nearly all mesh nodes in the system to communicate the statistics to a gateway node or a node in charge of frequency hopping pattern (FHP) management.

One or more nodes of the system, consisting of the processor, radio peripheral, read only memory, and random access memory, may execute logic to understand or identify failures reported by routers and nodes so as to make adjustments to a frequency hopping pattern.

It is possible to run FHP management on a separate unit which doesn't have a radio peripheral. The gateway node and such FHP management unit could be connected via wires.

A FTDMA (frequency hopping time division multiple access) network may provide a basis for avoiding a collision of communications among multiple devices in the same network or in different networks doing concurrent communications.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended features be interpreted as broadly as possible in view of the related art to include all such variations and modifications.

What is claimed is:

1. A system of frequency hopping comprising:

one or more meshes, each mesh having a hardware unit configured for multi-hop communication within the mesh and for receiving and transmitting communications via a gateway; and a generator of a frequency hopping pattern (FHP) consisting of a sequence of frequencies selected from a predetermined frequency band, connected to the gateway of the hardware unit;

wherein the gateway comprises:

a processor;

a random access memory (RAM) connected to the processor;

a read only memory (ROM) connected to the processor; and one or more radio peripherals connected to the processor;

wherein the gateway is configured for receiving and transmitting communications of the hardware unit at a frequency and duration of time of the frequency hopping pattern that are different than a frequency at a duration of time receiving and transmitting communications a hardware unit of a different mesh, or at a distance great enough between the hardware unit and the hardware unit of a different mesh so as to avoid a collision of receiving and transmitting communications between the hardware unit and the hardware unit of a different mesh or even if the latter hardware unit is alternatively of the same mesh;

wherein each hardware unit comprises one or more wireless sensors; and wherein the generator of the frequency hopping pattern for each of the one or more meshes incorporates a time division multiple access (TDMA) network; and wherein the frequency hopping pattern for each of the one or more meshes is based on an uniquely defined hopping length and automatically shifts its frequency or frequencies in each wireless communication slot.

2. The system of claim 1, wherein each gateway is connected to an authenticator, time server or internet.

3. The system of claim 1, wherein a communication of multiple TDMA networking occurs in a specific frequency band.

4. The system of claim 3, wherein the specific frequency band is divided into multiple frequencies/channels based on communication needs for bandwidth, data rate and distance.

5. The system of claim 4, wherein the multiple frequencies/channels are utilized one at a time according to the frequency hopping pattern (FHP) during a communication.

6. The system of claim 5, wherein further comprising a device that generates FHPs which are orthogonal relative to or different from FHPs of other communications independent of the present communication.

7. The system of claim 6, wherein an FHP is a sequence of one to n frequencies not necessarily in a numerical or other order.

8. The system of claim 6, wherein an FHP is a sequence of one to n frequencies having an order that changes over time of the present communication.

9. The system of claim 8, wherein:

in an FHP, a first time slot uses a first frequency, a second time slot uses a second frequency, and an nth time slot uses an nth frequency;

the FHP can repeat the first frequency, the second frequency and the nth frequency in that order and format after the nth time slot indefinitely as long as predetermined, needed, required, or desired; and n is a whole positive number that indicates a count of a total number of time slots and corresponding frequencies used by the slots.

10. The system of claim 8, wherein the FHPs of the present communication are orthogonal or different from other FHPs so as to avoid a collision with another communication having an overlap of similar FHPs intrusive from nearby geographical areas.

11. The system of claim 6, wherein:

an FHP is based on a uniquely defined hopping length which automatically shifts its frequency or frequencies in each wireless communication slot; and the FHP enables nodes to communicate in each frequency within a subject frequency band and avoid interference with other frequencies of another frequency band.

12. A mechanism for frequency hopping comprising:

one or more wireless networks configured for multi-hop communication within each network; and wherein:

each of the one or more wireless networks comprises one or more sensors providing a wireless communication;

each wireless communication occurs in a specific frequency band;

each specific frequency band is divided into multiple frequencies or channels;

frequency hopping occurs to avoid collisions among concurrent communications;

frequency hopping occurs according to an automatically generated frequency hopping pattern (FHP); and the frequency hopping pattern for each of the one or more wireless networks is based on a uniquely defined hopping length and automatically shifts its frequency or frequencies in each wireless communication slot.

13. The mechanism of claim 12, wherein the frequency hopping pattern is a sequence of frequencies.

14. The mechanism of claim 13, wherein:

the sequence of frequencies is a defined random frequency hopping pattern or a multiple of orthogonal or different frequency hopping patterns on one or more networks; and there is adjustability of one or more parameters of a group comprising frequency hopping pattern, channel bandwidth, channel count, slot count, and data rate at runtime based on mesh requirements or a load.

15. The mechanism of claim 12, wherein there is a generation of a frequency hopping pattern (FHP) scheme in frequency bands.

16. A system for implementing frequency hopping comprising:

wireless mesh nodes having a processor configured to execute an algorithm or logic, the wireless mesh nodes being configured for multi-hop communication within the mesh; and a radio peripheral connected to the processor configured to communicate wirelessly with devices;

a gateway node configured to perform gateway specific actions;

a router node configured to perform routing between nodes and the gateway node;

other nodes configured to send data to the gateway node via router nodes; and an algorithm or logic executed by a processor of virtually or nearly all mesh nodes, where statistics can be stored in a random access memory (RAM) for a successful transmit or receive to be used to identify failures;

wherein in each node, the processor runs logic to switch a frequency to another frequency after completion of a time slot, and the processor configures a transmit or receive frequency for the time slot based on a frequency hopping sequence algorithm.

17. The system of claim 16, further comprising an algorithm or logic which can be executed by virtually all mesh nodes in the system to communicate the statistics to a gateway node or a node in charge of frequency hopping pattern (FHP) management.

18. The system of claim 17, wherein one or more nodes of the system, which may be comprised of the processor, radio peripheral, read only memory, and random access memory, execute logic to understand or identify failures reported by routers and nodes so as to make adjustments to a frequency hopping pattern.

19. The system of claim 16, wherein a FTDMA (frequency hopping time division multiple access) network provides a basis for avoiding a collision of communications among multiple devices in the same network or in different networks doing concurrent communications.

* * * * *